United States Patent
Akhteruzzaman et al.

(10) Patent No.: US 6,584,316 B1
(45) Date of Patent: Jun. 24, 2003

(54) HANDOFF OF PHONE CALLS FROM WIRELESS TO WIRELINE NETWORK

(75) Inventors: Akhtar Akhteruzzaman, Naperville, IL (US); Paul R. Sand, Woodridge, IL (US); Richard G. Sparber, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,816

(22) Filed: May 5, 2000

(51) Int. Cl.$^7$ ................................................. H04Q 7/20
(52) U.S. Cl. ........................ 455/445; 455/417; 455/456
(58) Field of Search ................................. 455/445, 461, 455/436, 466, 456, 417

(56) References Cited

U.S. PATENT DOCUMENTS

| | | | | |
|---|---|---|---|---|
| 3,673,331 A | * | 6/1972 | Hair et al. .................... 704/203 |
| 5,479,482 A | | 12/1995 | Grimes ......................... 379/59 |
| 5,815,538 A | | 9/1998 | Grell et al. .................. 375/356 |
| 5,982,324 A | | 11/1999 | Watters et al. ............... 342/357 |
| 6,038,451 A | * | 3/2000 | Syed et al. ................... 455/445 |
| 6,151,500 A | * | 11/2000 | Cardina et al. .............. 455/435 |
| 6,181,780 B1 | * | 1/2001 | Finnigan ..................... 379/67.1 |
| 6,233,448 B1 | * | 5/2001 | Alperovich et al. ......... 455/414 |
| 6,285,984 B1 | * | 9/2001 | Speicher ....................... 705/14 |
| 6,301,474 B1 | * | 10/2001 | Hartmaier et al. ........... 455/417 |
| 6,393,288 B1 | * | 5/2002 | Sollee et al. ................ 455/433 |

\* cited by examiner

*Primary Examiner*—Thanh Cong Le
*Assistant Examiner*—Lana Le
(74) *Attorney, Agent, or Firm*—Emrich & Dithmar (57) ABSTRACT

Telephone calls are handed off from a wireless network to a wireline network under the control of a subscriber. When at a given location, the subscriber enters the directory number of the wireline terminal (typically the closest) to which a future wireless call is to be transferred. The entered directory number is then stored in memory in the subscriber's wireless terminal with the current location of the subscriber as determined by a satellite-based global positioning system (GPS) for future use. If the subscriber wants to transfer a call to a wireline terminal, the subscriber selects a transfer handoff key on the subscriber's wireless terminal. After the subscriber's location is determined using the GPS, it is then determined if a directory number (DN) of a designated wireline terminal has previously been entered and stored in memory for the subscriber's present location. If so, the call is transferred to the designated wireline terminal using the local cellular network and the wireless call is terminated. If the DN of a wireline terminal associated with the subscriber's present location has not previously been entered, the wireless call is allowed to continue. Automatic call forwarding to a designated wireline terminal is also provided for in the event of a weak received signal link using a table of previously entered wireline terminal DN's. In both manual and automatic transfer of a wireless call, the subscriber must pick up the ringing wireline terminal to complete call transfer.

13 Claims, 5 Drawing Sheets

HANDOFF OF PHONE CALLS FROM WIRELESS TO WIRELINE NETWORK

TECHNICAL FIELD OF THE INVENTION

This invention relates generally to wireline and wireless telephone networks and is particularly directed to the handoff of calls from a wireless network to a wireline network either manually under the control of a subscriber or automatically such as in the event of a weak received signal.

BACKGROUND OF THE INVENTION

Telephone-communication today is accomplished either by a wireline or a wireless telephone network. The wireline telephone network includes a first voice terminal (first subscriber set), a wireline to a switching office, large capacity physical trunks between switching offices, and a wire line to another voice terminal, (second subscriber set). The switching offices as well as the connection between the switching offices is known as a Public Switched Telephone Network (PSTN). The major components of a wireless telephone network, or cellular system, include a Mobile Switch Center (MSC), a Base Station (BS), also known as a Cell Site (CS), and a Mobile Station (MS), also known as a Mobile Unit (MU). The MSC interconnects the cellular system with the PSTN.

Currently, if a subscriber or user (which terms are used interchangeably hereafter) originates a telephone call on a cellular network and desires to continue the call on a wireline network the call must be disconnected on the cellular network and re-established on the wireline network. This is typically accomplished by terminating operation of the mobile unit, followed by initiating a new call via a wireline terminal to the directory number to which the terminated call was placed. Terminating the call on the cellular network and re-establishing the call on the wireline network may be desirable for various reasons. For example, the caller may wish to terminate the call on the cellular network and re-establish it on the wireline network to obtain the benefit of better voice quality and less expensive service on the wireline network. While it may be desirable under certain circumstances to transfer the call, the process of transferring the call is cumbersome, inefficient and time consuming.

In addition, today wireless users have available a call forwarding feature which may be used to temporarily direct inbound calls to another number which may be a wireline terminal number. Wireless calls may be forwarded to a wireline terminal to avoid wireless airtime charges or the effect of a low signal strength area when the mobile subscriber is near a designated wireline terminal. The process of activating/deactivating call forwarding is manual, cumbersome, and prone to error. Each time the wireless subscriber nears a wireline terminal to which it is desired to direct new, inbound calls, the subscriber must program the wireline terminal's directory number as the forwarded number. Additionally, when the subscriber leaves the vicinity of the wireline terminal, the subscriber must deactivate call forwarding or inbound calls will continue to be sent to the wireline terminal that the subscriber is no longer in close proximity to.

The present invention addresses the aforementioned limitations of the prior art by providing for the handoff of a telephone call from a first wireless network to a second wireline network either manually or automatically. The present invention also provides for the automatic activation/deactivation of call forwarding to selected, preprogrammed wireline terminal numbers.

SUMMARY OF THE INVENTION

The present invention contemplates the handing off of telephone calls from a wireless network to a traditional wireline network either automatically or under the control of the subscriber. In order to later transfer a telephone call from the wireless to the wireline network, the subscriber, when in the vicinity of a designated wireline terminal to which it is desired to transfer a call, selects a transfer handoff key on the mobile terminal and enters the directory number (DN) of the designated wireline terminal. At this time, the wireless terminal determines the present coordinates of the subscriber by means of a satellite-based global positioning system (GPS) and stores the wireline terminal DN and present coordinates in a table in its memory for later use. The telephone number of the designated wireline terminal is thus matched with a given set of coordinates for possible future use in transferring a wireless telephone call to the wireline network.

When the subscriber desires to transfer a wireless call to the wireline network, the subscriber selects the handoff function key on the mobile terminal. The mobile terminal then determines its present coordinates using GPS information, compares its present coordinates with the coordinates of various wireline terminals whose directory numbers are stored in memory, determines the wireline terminal closest to its present coordinates within a predetermined range from its present coordinates, and transfers the call to that wireline terminal. Transfer of the call from the wireless network to the wireline network is accomplished by the wireless terminal providing the wireline directory number of the designated wireline terminal to the Mobile Switching Center (MSC) of the wireless network. The MSC then bridges the wireless call to the wireline terminal and provides a signal to the designated wireline terminal. The subscriber then picks up the receiver at the designated wireline terminal resulting in an "answer" signal being transmitted from the designated wireline terminal to the MSC. The MSC then drops the connection to the wireless terminal while maintaining the connection between the designated wireline terminal and the other party.

Another embodiment of the invention allows a subscriber to have wireless calls automatically forwarded to a designated wireline terminal (or perhaps plural wireline terminals) if the signal strength is weak whenever the wireless terminal is within a predetermined distance from the wireline terminal (or terminals) as determined by the location of both terminals using GPS coordinate information. This allows for the automatic forwarding of a wireless telephone call to the nearest wireline terminal to provide the best possible telephone call reception.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
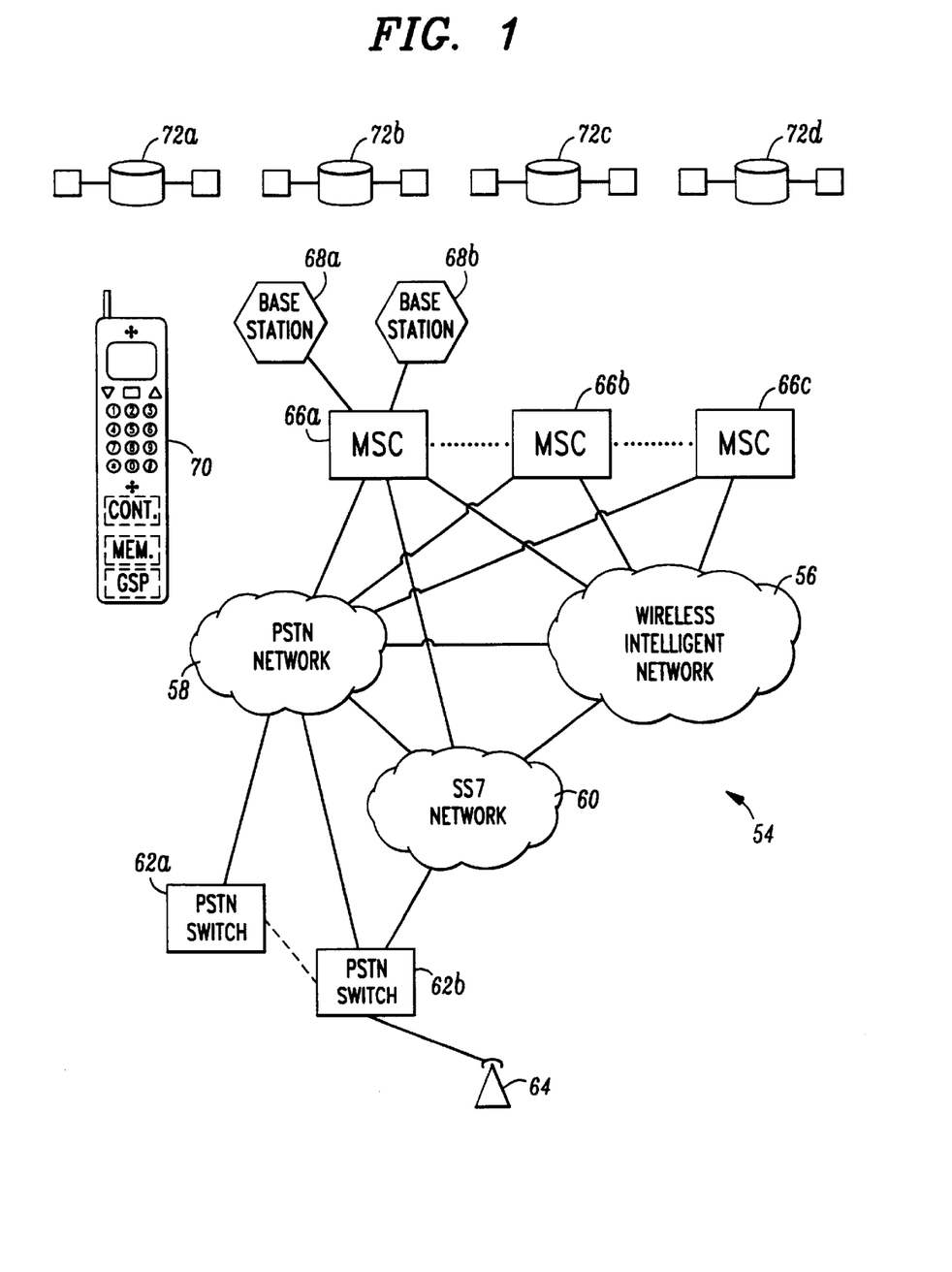
FIG. 1 is a simplified schematic diagram of a combined wireline and wireless communications network employing position locating satellites for handing off telephone calls from the wireless to the wireline network in accordance with the present invention.

Referring to FIG. 1, there is shown a simplified schematic diagram of a telephone call handoff system 54 employing position locating satellites for handing off telephone calls from a wireless network to a wireline network in accordance with the principles of the present invention. The telephone call handoff system 54 includes a cellular telephone network comprised of a signaling system 7 (SS7) network 60, a wireless intelligent network 56, plural Mobile Switching Centers (MSCs) 66a, 66b and 66c, and plural base stations 68a and 68b. Only the first MSC 66a as shown with base stations 68a and 68b for simplicity, it being understood that the second and third MSCs 66b and 66c similarly support plural base stations in the cellular network. MSCs are involved with switching calls between different base stations, or cell sites, in realtime as a subscriber moves from one area of coverage of one base station to that of another. This process is known as call "handoff" of a subscriber mobile terminal 70 between adjacent base stations. Each MSC serves as a central coordinator and controller for the cellular services within its area and functions as an interface between each base station and a Public Switched Telephone Network (PSTN) 58 to which the MSC is connected. All of the information exchanged between MSCs 66a, 66b and 66c and the PSTN network 58 is done by standard telephone signaling techniques. Each MSC administers radio channels allocated to the cellular system and to individual base stations, coordinates paging and handoff functionality, and maintains the integrity of the cellular system.

The PSTN network 58 typically includes plural PSTN switches 62a and 62b as well as a large number of wireline terminals, where one of the wireline terminals is shown as element 64 in the figure. The PSTN network 58 is connected to the MSCs 66a, 66b and 66c, as well as to the wireless intelligent network 56 and the SS7 network 60. All of the elements discussed thus far are standard components of a combined wireline and wireless communications network. It is in the unique operation of the subscriber mobile terminal 70 and MSCs 66a, 66b and 66c that the present invention resides.

The telephone call handoff system 54 further includes plural satellites orbiting the earth such as shown for the case of satellites 72a, 72b, 72c and 72d. The satellites are of the global positioning type and are preferably part of the Global Positioning System (GPS) operated by the U.S. Department of Defense. This well known navigation and location system employs triangulation using synchronized signals received from four or more of a set of GPS satellites orbiting the earth. The present invention employs the position locating feature of the GPS for identifying the current coordinates of a wireless terminal 70 having a GPS receiver. This allows the wireless terminal 70 to determine its present geographic location in terms of latitude and longitude coordinates. Determining the present geographic location of the wireless terminal 70 may employ any of the more common approaches now available to determining present latitude and longitude coordinates as briefly discussed in the following paragraph.

One approach that could be used in providing the wireless terminal 70 with its present latitude and longitude coordinates is disclosed in U.S. Pat. No. 5,479,482. In this approach, a GPS receiver in a cellular terminal receives geo-coordinate information from plural GPS satellites. The cellular terminal converts these geo-coordinates to present location information, which location information is then transmitted to a public safety answering point via a cellular switching system such as to provide public emergency call location information. Another approach which could be used in the present invention to provide present location information for wireless terminal 70 is disclosed in U.S. Pat. No. 5,815,538. In this approach, the location of a subscriber device in a wireless cellular communications system is established by transmitting digital data signals to a cellular digital data receiver in the subscriber device from at least three different cellular cell site transmitters at known locations. Each data signal includes a time-synchronized synchronization signal which is preferably synchronized through the time signals of the global positioning system. The time of arrival of each of the time-synchronized synchronization signals is determined with respect to an internal clock of the receiver. The present location of the subscriber device is established from the known locations of the several cell sites in combination with the times of arrival of the synchronization signals relative to the receiver's internal clock. Still another approach which could be used in the present invention for providing present location information to wireless terminal 70 is disclosed in U.S. Pat. No. 5,982,324. In this approach, a cellular network is utilized to collect differential GPS error correction data which is forwarded to a mobile terminal via the cellular network. The mobile terminal receives this data, along with GPS pseudoranges using a GPS receiver and calculates its position using this information. In another embodiment, when the requisite number of GPS satellites are not in view of the mobile terminal, a GPS pseudosatellite signal transmitted from a base station in the cellular network is received by the mobile terminal and processed as a substitute for the missing GPS satellite signal. A third embodiment is used when the requisite number of GPS satellites are not in clear view of the GPS receiver, with the system then switching from relying on the GPS portion of the system to utilizing the cellular network infrastructure to determine location. This is done by using either time of arrival (TOA) or time difference of arrival (TDOA) methods for determining location in the cellular network portion of the system. When the mobile terminal is moved to a location where the requisite number of satellites are again in clear view of GPS receiver, the system switches back to using the GPS portion of the system to determine location. Any of the aforementioned approaches for accurately determining the position of the wireless terminal 70 could be used in implementing the present invention.

Figure 2:
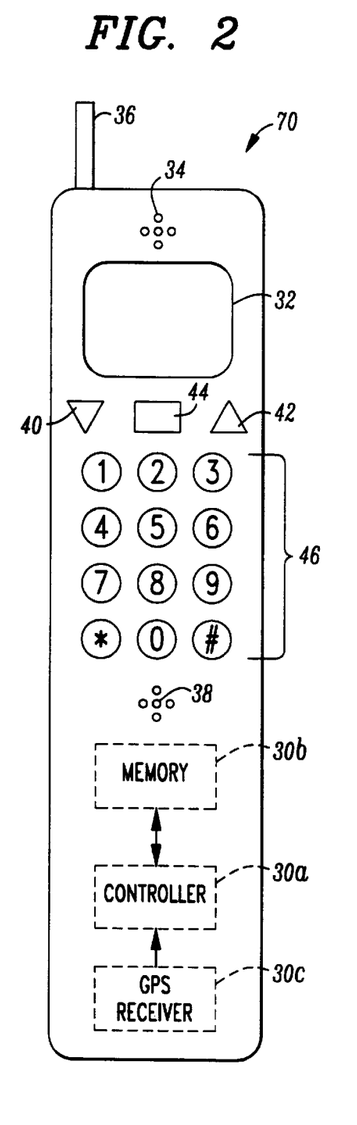
FIG. 2 is a simplified schematic diagram shown partially in phantom of a wireless terminal and control panel therefor for use in handing off telephone calls from a wireless to a wireline network in accordance with the present invention.

Referring to FIG. 2, there is shown a combined plan view and simplified schematic diagram of the wireless terminal 70 used in the present invention. As shown in the figure, the wireless terminal 70 includes a video display 32, such as, for example, in the form of a liquid crystal diode (LCD) screen for presenting information to the subscriber. Wireless terminal 70 further includes a speaker 34, a microphone 38, and an antenna 36. Wireless terminal 70 also includes a set off alphanumeric keys 46, as well as menu down and menu up selectors 40, 42 and a soft selector key 44. The menu down and menu up selectors, 40, 41 permit the soft selector key 44 to be used in various functional modes. One mode in which the soft selector key 44 is used in the present invention is as a call transfer handoff key for manually transferring a call from a wireless to a wireline network as described below. Another mode in which the soft selector key 44 is used in the present invention is to store in memory the present coordinates of the mobile terminal 70 as well as the directory number to (DN) of a wireline terminal in the vicinity of the wireless terminal to which a telephone call is to be transferred. The handheld mobile terminal 70 also includes a controller 30a, a memory 30b and a GPS receiver 30c. Controller 30a controls the operation of the mobile terminal 70 in accordance with an operating program stored therein. Memory 30b stores such information as geographic coordinates and directory numbers of wireline terminals located in the vicinity of stored geographic coordinates for the transfer of telephone calls as described below. The GPS receiver 30c permits the wireless terminal 70 to accurately determine its present location using GPS coordinate information. The handheld mobile terminal 70 is used in the following manner to hand off a telephone call from a wireless to a wireline network.

Figure 3:
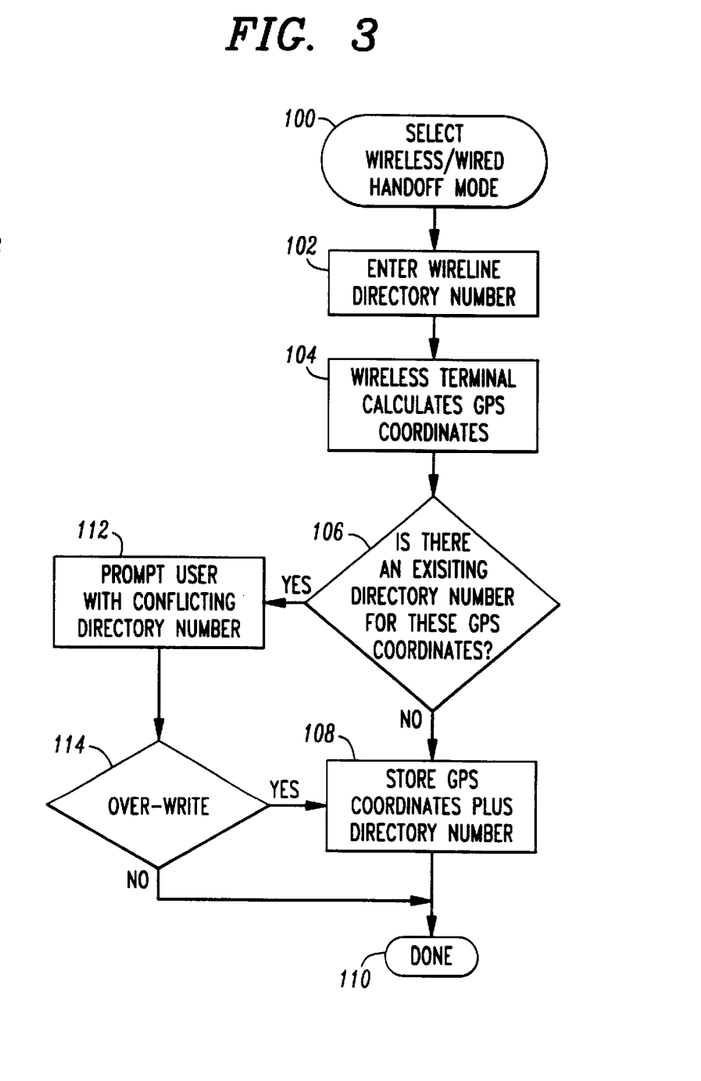
FIG. 3 is a simplified flow chart illustrating the series of steps involved in storing a designated wireline directory number with an associated set of coordinates in the memory of a wireless terminal for possible later use in transferring a wireless call to the designated wireline directory number based upon the location of the wireless terminal or in activating automatic call forwarding to a designated wireline terminal.

Referring to FIG. 3, there is shown a simplified flow chart illustrating the series of steps involved in storing a designated wireline directory number (DN) with an associated set of geographic coordinates in the memory 30b of the wireless terminal 70 for possible later use in transferring a wireless call to the designated wireline directory number based upon the present location of the wireless terminal in accordance with one aspect of the present invention. A subscriber must initially determine to which wireline terminal it is desired to hand off a wireless telephone call when at a given location. This procedure is initiated at step 100 by the subscriber selecting the soft selector key 44 on the wireless terminal 70 for initiating the handoff mode. In this mode, the soft selector key 44 is used to store information in memory 30b. The subscriber then at step 102 enters the DN of the wireline terminal to which it is desired to transfer a wireless telephone call at the present location of the wireless terminal 70. The wireless terminal 70 then automatically at step 104 determines its present location in latitude and longitude coordinates based upon information received by the wireless terminal's GPS receiver 30c. The wireless terminal's controller 30a at step 106 then determines if there is an existing directory number stored in the terminal's memory 30b for the coordinates calculated at step 104 or which overlaps within a predetermined range a previously stored directory number. If at step 106 it is determined that there is not an existing directory number in the wireless terminal's memory 30b, the program proceeds to step 108 and stores the GPS coordinates calculated at step 104 together with the wireline directory number entered at step 102 in the wireless terminal's memory 30b in an associated manner. The program then proceeds to step 110 and is completed. If at step 106 it is determined that there is an existing directory number for the calculated GPS coordinates stored in the wireless terminal's memory 30b, the program proceeds to step 112 and provides a prompt to the subscriber such as on the terminal's video display 32 that there are conflicting directory numbers. The program then at step 114 allows the subscriber to overwrite the existing directory number with the wireline directory number entered in step 102. The program then proceeds to step 108 for storing the GPS coordinates calculated at step 104 with the wireline directory number entered at step 102 in the wireless terminal's memory 30b. If the subscriber elects not to overwrite the existing directory number in the wireless terminal's memory 30b at step 114, the program proceeds to step 110 and is completed.

Figure 4:
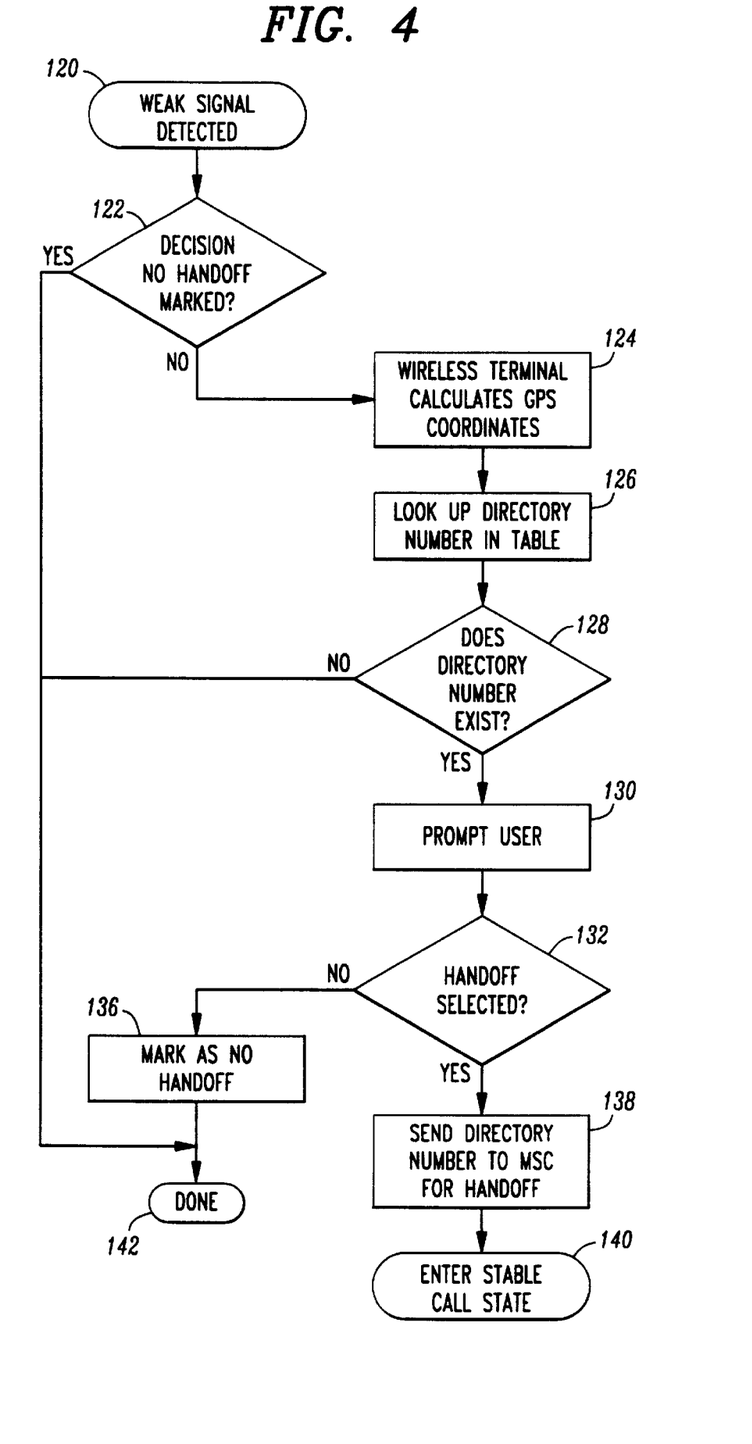
FIG. 4 is a simplified flow chart illustrating the steps involved in the automatic handoff of a wireless telephone call from a wireless terminal to a designated wireline terminal in the vicinity of the wireless terminal in accordance with another aspect of the present invention.

Referring to FIG. 4, there is shown a simplified flow chart illustrating the steps involved in the automatic handoff of a wireless telephone call to a designated wireline terminal in accordance with another aspect of the present invention. FIG. 4 also shows the series of steps involved in activating automatic call forwarding to a designated wireline terminal in accordance with another aspect of the present invention. The automatic transfer of a wireless call to a wireline terminal is initiated at step 120 with the detection by the wireless terminal 70 of a weak received signal. Conventional means such as a software routine or a signal strength comparator circuit or threshold level detection circuit may be used in the wireless terminal 70 to determine if the received signal strength is less than a predetermined level. The program then proceeds to step 122 and determines if the decision has been made in the program not to handoff a weak received signal to a designated wireline terminal. If the program does not provide for the automatic handoff of a wireless telephone call in the event of a weak received signal, the program proceeds to step 142 and is complete. If at step 122 it is determined that a wireless telephone call with a weak received signal is to be automatically handed off to a wireline terminal, the program proceeds to step 124 with the wireless terminal calculating its current GPS coordinates using information from its GPS receiver. The program then proceeds to step 126 to look up a directory number stored in the wireless terminal's memory 30b associated with the GPS coordinates calculated at step 124. If the program at step 128 determines that there is no directory number stored in the wireless terminal's memory 30b associated with the GPS coordinates calculated at step 124, the program proceeds to step 142 and is complete. If at step 128 it is determined that a directory number associated with the GPS coordinates calculated at step 124 is stored in the wireless terminal's memory 30b, the program proceeds to step 130 and prompts the subscriber so that the call can be handed off to a designated wireline terminal. If at step 132 a subscriber elects not to hand off the wireless telephone call to a designated wireline terminal, the program proceeds to step 136 and marks the call as do not execute a call handoff and then proceeds to step 142 and is completed. If at step 132 the subscriber elects to handoff the wireless telephone call having an associated weak signal strength by providing the appropriate input command on the wireless terminal 70, the program proceeds to step 138 and provides the directory number of the designated wireline terminal stored in the wireless terminal's memory 30b to an MSC in the cellular network for handing off the telephone call. The program then proceeds to step 140 and enters the stable call state for transferring the wireless call to the designated wireline terminal.

Figures 5, 6:
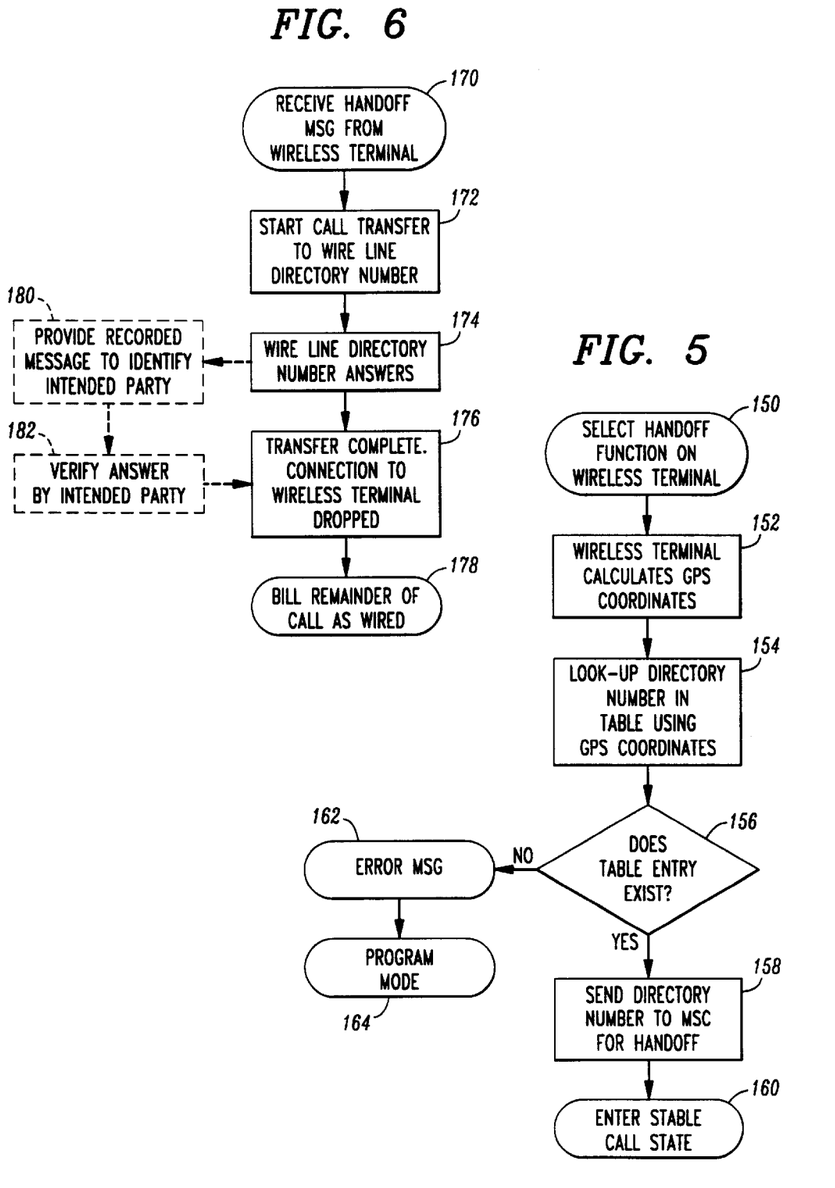
FIG. 5 is a simplified flow chart illustrating the series of steps involved in manually transferring a telephone call from a wireless terminal to a designated wireline terminal in accordance with the another aspect of the present invention.
FIG. 6 is a simplified flow chart illustrating the steps involved in handing off a telephone call from a wireless terminal to a wireline terminal via a Mobile Switching Center in accordance with the principles of the present invention.

Referring to FIG. 5, there is shown a simplified flow chart illustrating the steps involved in manually transferring a wireless call under the control of the subscriber to a designated wireline terminal. The program is initiated at step 150 with the selection by the subscriber of the soft selector key 44 in the call transfer mode on the wireless terminal 70. The program stored in the wireless terminal's controller 30a then calculates the current GPS coordinates of the wireless terminal at step 152 using GPS positioning information. The program then proceeds to step 154 and determines if there is an associated directory number for a wireline terminal for the GPS coordinates calculated at step 152 stored in the wireless terminal's memory 30b. The program then determines at step 156 if a directory number associated with the calculated GPS coordinates is stored in a table in the wireless terminal's memory 30b. If at step 156 it is determined that there is no directory number stored in the wireless terminal's memory 30b associated with the GPS coordinates calculated at step 152, the wireless terminal displays an error message on its video display 32 at step 162 permitting the subscriber to select the program mode at step 164 which is described above and shown in FIG. 3. If at step 156 it is determined that a directory number associated with the GPS coordinates calculated at step 152 is stored in the wireless terminal's memory 30b, the program proceeds to step 158 and transmits the directory number from the wireless terminal to an MSC of the wireless network for handing the wireless call off to the designated wireline terminal. The program then proceeds to step 160 and enters the stable call state for transferring the wireless call to the designated wireline terminal.

Referring to FIG. 6, there is shown a simplified flow chart illustrating the steps carried out by an MSC of the cellular network in transferring a call from a wireless terminal to a designated wireline terminal in accordance with another aspect of the present invention. The program stored in the MSC is initiated at step 170 with receipt by the MSC of a handoff message from the wireless terminal from which the telephone call is to be transferred. The MSC program then at step 172 initiates a call transfer to the directory number of the designated wireline terminal from the wireless terminal. The call to the designated wireline terminal which has its directory number stored in the wireless terminal's memory 30b is then answered at step 174 by the subscriber. The MSC program then completes transfer of the telephone call at step 176 to the designated wireline terminal and drops the connection to the wireless terminal from which the telephone call has been transferred. The program stored in the MSC then bills the remainder of the call at the wireline telephone call rate at step 170 which is generally less than the rate of a wireless telephone call.

The wireline terminal to which a telephone call is transferred may be a public telephone. In this event, after the call to the designated wireline directory number is answered as shown in step 174 in FIG. 6, the program in the MSC provides a prerecorded message to identify the intended party of the transferred call at step 180 as shown in dotted line form in FIG. 6. Examples of such prerecorded messages may be "Call from John Smith, please have John Smith come to the phone" and to the party at the other end of the line "Please hold while we contact your party". Conventional means such as voice recognition may then be used at step 182 (also shown in phantom) to verify that the call has been answered by the intended party. If the intended party does not answer the transferred telephone call within a predetermined time, the transferred telephone call is dropped and the caller may be routed to the intended party's voice mail. After verifying that the intended party has answered the transferred call at the designated wireline terminal at step 182, the program proceeds to step 176 for completing transfer of the call to the wireline terminal and dropping the connection to the wireless terminal.

Figure 7:
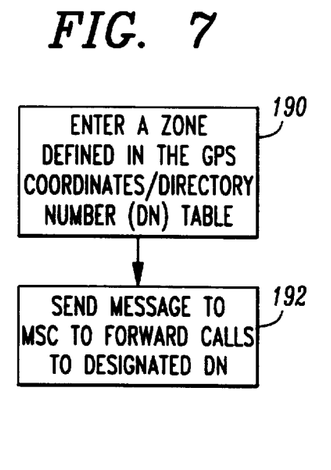
FIG. 7 is a simplified flow chart illustrating the steps carried out in activating an automatic call forwarding mode from a wireless terminal to a wireline terminal in accordance with another aspect of the present invention.

Referring to FIG. 7, there is shown in simplified flow chart form the steps carried out in activating an automatic call forwarding mode from a wireless terminal to a wireline terminal having a designated DN in accordance with another aspect of the present invention. At step 190, a subscriber having, the mobile terminal enters a zone defined in terms of geographic coordinates previously stored in a table. Each set of geographic coordinates is stored in the table with an associated DN of a wireline terminal located at or near the stored geographic coordinates. Thus, each set of geographic coordinates is stored in the table with the DN of an associated wireline terminal located at or near the stored coordinates. At step 192, a message is sent from the mobile terminal to the mobile switching center (MSC) of the cellular network by means of a data link for actuating an automatic call forwarding mode of operation to a designated DN. Thus, a call placed to a mobile terminal of a subscriber located near or in the vicinity of a designated wireline terminal in a given zone will result in automatic forwarding of the call to the designated wireline terminal.

Figure 8:
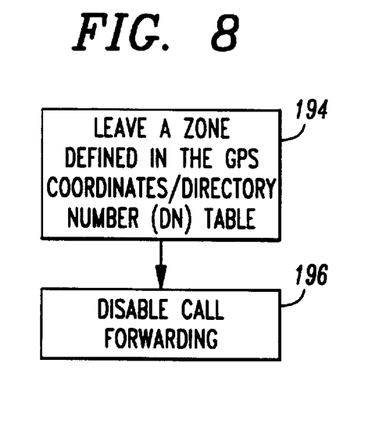
FIG. 8 is a simplified flow chart illustrating the steps involved in disabling an automatic call forwarding mode of operation from a wireless terminal to a wireline terminal in accordance with yet another aspect of the present invention.

Referring to FIG. 8, there is shown a simplified flow chart of the steps involved in disabling the automatic call forwarding mode of operation just described in terms of FIG. 7 in accordance with another aspect of the present invention. At step 194, the subscriber leaves a zone defined in terms of geographic coordinates and having an associated DN of a designated wireline terminal stored in the table. At step 196, the automatic call forwarding mode is disabled and calls to the mobile terminal will no longer be automatically forwarded to the designated wireline DN because the mobile subscriber has departed from the vicinity, or zone, of the designated wireline DN. A disabling signal is provided from the mobile terminal to the MSC via the aforementioned data link in a conventional manner. The table in which the geographic coordinates and directory numbers are stored is located in the mobile terminal which permits the mobile terminal, using its GPS receiver, to continuously compare its present location with the stored coordinates of the designated wireline terminals for automatic call forwarding. The size of a given zone associated with the location of a designated wireline terminal may be fixed as desired using conventional programming.

Figure 9:
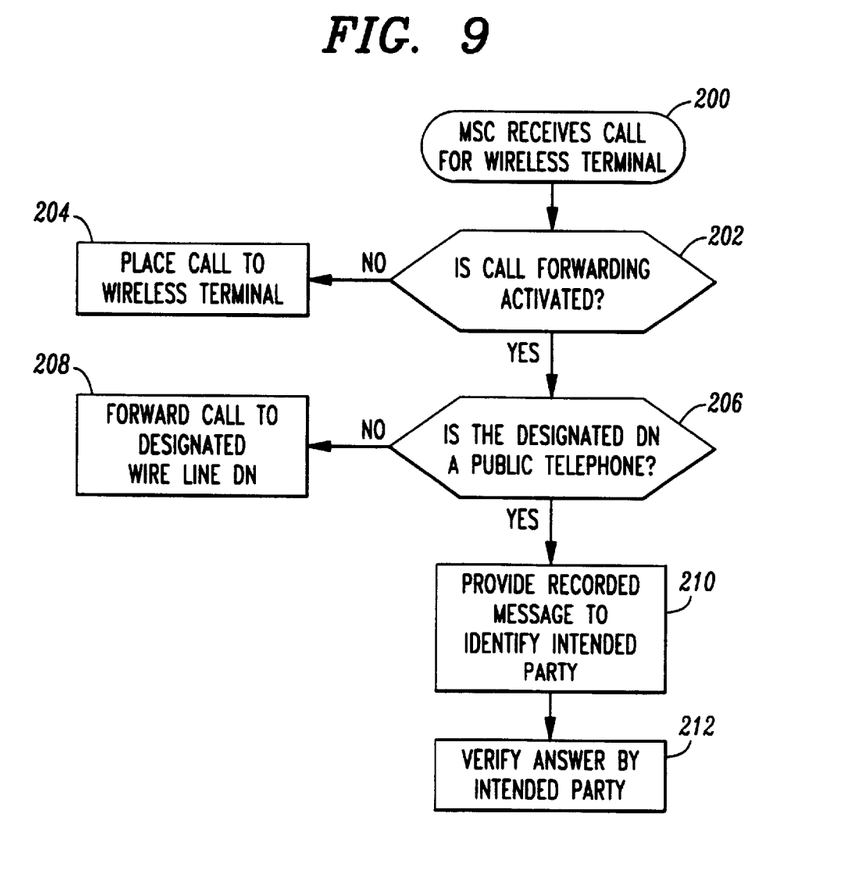
FIG. 9 is a simplified flow chart illustrating the series of steps carried out by a mobile switching center in a cellular telephone network in the automatic call forwarding mode of operation from a wireless to a wireline network in accordance with another aspect of the present invention.

Referring to FIG. 9, there is shown a simplified flow chart of the series of steps involved in the automatic call forwarding of a call placed to a mobile terminal which is forwarded to a designated wireline terminal. At step 200, the MSC receives a call for a wireless terminal. At step 202, a program stored in the MSC determines if automatic call forwarding is activated. If automatic call forwarding is not activated, the program proceeds to step 204 and places the call to the wireless terminal having the selected DN. If at step 202 it is determined that automatic call forwarding is activated, the program proceeds to step 206 and determines if the designated DN is a public telephone. If at step 206 it is determined that the designated DN is not a public telephone, the program proceeds to step 208 and forwards the call to the designated, non-public telephone wireline DN. If at step 206 it is determined that the designated DN is a public telephone, the program proceeds to step 210 and provides a recorded message to the designated public telephone for the purpose of identifying the intended party of the call as described above with respect to FIG. 6. The program then proceeds to step 212 for verifying that the call has been answered by the intended party at the designated public telephone DN also is previously described with respect to FIG. 6.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A method for handing off a telephone call from a first terminal in a wireless network to a second terminal in a wireline network, wherein said second terminal has an associated directory number, said method comprising the steps of:

storing in a memory in the first terminal the directory number of the second terminal when the first terminal is in the vicinity of the second terminal;

determining the geographic coordinates of the first terminal when the first terminal is in the vicinity of the second terminal;

storing the geographic coordinates with the directory number in said memory in an associated manner;

placing a telephone call on the wireless network using the first terminal;

selecting a telephone call handoff selector key on the first terminal for transferring the telephone call to the wireline network;

determining the current geographic coordinates of the first terminal and comparing said current geographic coordinates with the geographic coordinates stored in said memory;

generating a signal to initiate the transfer of the telephone call to the second terminal if the current geographic coordinates of the first terminal match the geographic coordinates stored in said memory; or comparing a signal strength of a telephone call from the first terminal in the wireless network with a reference signal level and, if the signal strength of the telephone call is less than said reference signal level, determining the current geographic coordinates of the first terminal for automatically transferring the telephone call to the second terminal if the current geographic coordinates of the first terminal match the geographic coordinates stored in said memory associated with the second terminal; and terminating the telephone call on the wireless network.

2. The method of claim 1 further comprising the step of storing in said memory the directory numbers of plural second terminals in the wireline network when the first terminal is in the vicinity of each respective second terminal and further determining and storing the geographic coordinates of the first terminal when in the vicinity of each respective second terminal, wherein each directory number is stored in an associated manner with the geographic coordinates of the first terminal when the first terminal is in the vicinity of a respective second terminal for transferring a telephone call from the wireless network to any of said second terminals in the wireline network.

3. The method of claim 1 further comprising the step of comparing the directory number of the designated wireline terminal with the contents of said memory to determine the presence in said memory of a previously stored directory number associated with the geographic coordinates of said designated wireline terminal and for overriding a directory number previously stored in said memory with the directory number of the designated wireline terminal.

4. The method of claim 1 further comprising the step of changing a billing rate chargeable to a subscriber when the telephone call is switched from the wireless network to the wireline network.

5. The method of claim 1 further comprising the step of providing a voice message to the second terminal for identifying an intended recipient of the telephone call where the second terminal is a public telephone.

6. The method of claim 5 further comprising the step of routing the telephone call to the intended recipient's voice mail if the intended recipient of the telephone call does not respond on the second terminal within a designated time period.

7. A method for handing off a telephone call from a first terminal in a wireless network to a second terminal in a wireline network, wherein said second terminal has an associated directory number, said method comprising the steps of:

storing in a memory in the first terminal the directory number of the second terminal when the first terminal is in the vicinity of the second terminal;

determining the geographic coordinates of the first terminal when the first terminal is in the vicinity of the second terminal;

storing the geographic coordinates with the directory number in said memory in an associated manner;

placing a telephone call on the wireless network using the first terminal;

selecting a telephone call handoff selector key on the first terminal for transferring the telephone call to the wireline network;

determining the current geographic coordinates of the first terminal and comparing said current geographic coordinates with the geographic coordinates stored in said memory;

generating a signal to initiate the transfer of the telephone call to the second terminal if the current geographic coordinates of the first terminal match the geographic coordinates stored in said memory;

verifying the identity of a person answering the public telephone as an intended recipient of the telephone call including using voice recognition of the intended recipient of the telephone call; and terminating the telephone call on the wireless network.

8. A method for handing off a telephone call from a first terminal in a wireless network to one of a plurality of second terminals in a wireline network, wherein each of said second terminals has an associated directory number, said method comprising the steps of:

storing in a memory in the first terminal the directory number of each of said plural second terminals in the wireline network when the first terminal is in the vicinity of each respective second terminal;

determining the geographic coordinates of the first terminal when the first terminal is in the vicinity of each respective second terminal;

storing the geographic coordinates of the first terminal when in the vicinity of each respective second terminal with the directory number of the second terminal that the first terminal is in the vicinity of in said memory in an associated manner;

placing a telephone call on the wireless network using the first terminal;

determining the current geographic coordinates of the first terminal and comparing said current geographic coordinates with the geographic coordinates stored in said memory;

comparing a signal strength of a telephone call from the first terminal in the wireless network with a reference signal level and, if the signal strength of the telephone call is less than said reference signal level, automatically generating a signal to initiate transfer of the telephone call to one of the second terminals if the current geographic coordinates of the first terminal match the geographic coordinates stored in said memory associated with said one of the second terminals; and terminating the telephone call on the wireless network.

9. A method for the automatic forwarding of a telephone call placed to a first terminal in a wireless network to a second terminal in a wireline terminal via a mobile switching center, wherein said second terminal has an associated directory number, said method comprising the steps of:

storing in a memory in the first terminal the directory number of the second terminal when the first terminal is in the vicinity of the second terminal;

determining the geographic coordinates of the first terminal when the first terminal is in the vicinity of the second terminal;

storing the geographic coordinates of the first terminal when in the vicinity of the second terminal with the directory number in said memory in an associated manner;

activating a call forwarding mode of operation in the mobile switching center;

placing a telephone to the first terminal via the wireless network;

determining the current geographic coordinates of the first terminal and comparing said current geographic coordinates with the geographic coordinates stored in said memory;

generating a signal to initiate the transfer of the telephone call to the second terminal if the current geographic coordinates of the first terminal match the geographic coordinates stored in said memory; or comparing a signal strength of a telephone call to the first terminal in the wireless network with a reference signal level and, if the signal strength of the telephone call is less than said reference signal level, determining the current geographic coordinates of the first terminal for automatically transferring the telephone call to the second terminal if the current geographic coordinates of the first terminal match the geographic coordinates stored in said memory associated with the second terminal; and terminating the telephone call on the wireless network.

10. The method of claim 9 further comprising the step of changing a billing rate chargeable to a subscriber when the telephone call is switched from the wireless network to the wireline network.

11. The method of claim 9 further comprising the step of providing a voice message to the second terminal for identifying an intended recipient of the telephone call where the second terminal is a public telephone.

12. The method of claim 11 further comprising the step of routing the telephone call to the intended recipient's voice mail if the intended recipient of the telephone call does not respond on the second terminal within a designated time period.

13. A method for the automatic forwarding of a telephone call placed to a first terminal in a wireless network to a second terminal in a wireline terminal via a mobile switching center, wherein said second terminal has an associated directory number, said method comprising the steps of:

storing in a memory in the first terminal the directory number of the second terminal when the first terminal is in the vicinity of the second terminal;

determining the geographic coordinates of the first terminal when the first terminal is in the vicinity of the second terminal;

storing the geographic coordinates of the first terminal when in the vicinity of the second terminal with the directory number in said memory in an associated manner;

activating a call forwarding mode of operation in the mobile switching center;

placing a telephone to the first terminal via the wireless network;

determining the current geographic coordinates of the first terminal and comparing said current geographic coordinates with the geographic coordinates stored in said memory;

generating a signal to initiate the transfer of the telephone call to the second terminal if the current geographic coordinates of the first terminal match the geographic coordinates stored in said memory;

verifying the identity of a person answering the public telephone as an intended recipient of the telephone call including using voice recognition of the intended recipient of the telephone call; and terminating the telephone call on the wireless network.

* * * * *